UNITED STATES PATENT OFFICE.

HENRY DESBOROUGH PHILLIPS, OF INDIANAPOLIS, INDIANA.

COMPOSITION OF MATTER FOR CONCRETE.

954,692. Specification of Letters Patent. Patented Apr. 12, 1910.

No Drawing. Application filed March 27, 1909. Serial No. 486,172.

*To all whom it may concern:*

Be it known that I, HENRY DESBOROUGH PHILLIPS, of Indianapolis, in the county of Marion and State of Indiana, have invented certain new and useful Improvements in Composition of Matter for Concrete; and I do hereby declare the following to be a full, clear, and exact description of the invention, such as will enable others skilled in the art to which it appertains to make and use the same.

My invention relates to an improved composition of matter for concrete, the object of the invention being to provide a composition which when set will be impervious to water. This composition is made up in batches and consists of the following ingredients, combined in substantially the following proportions, viz,—

| | |
|---|---|
| Cement | 100 pounds. |
| Arsenious acid | 6 pounds. |
| Mica crystals | 5 pounds. |
| Sulfur | 2 pounds. |
| Sand | 300 pounds. |
| Gravel or broken stone | 700 pounds. |

The cement and chemicals are thoroughly mingled in a dry state, after which the sand and gravel or broken stone are added. To the mixture thus formed sufficient water is added and when thoroughly mixed the batch is ready for use.

The ingredients in the proportions set forth are particularly well adapted for making concrete. In the composition described, the arsenious acid renders the concrete very tough and strong and the mica crystals render it non-absorbent, which in concrete work is very important.

Having fully described my invention what I claim as new and desire to secure by Letters-Patent, is,—

The herein described composition of matter for the manufacture of concrete, consisting of cement, arsenious acid, mica crystals, sulfur, sand, and gravel or broken stone, in the proportions described.

In testimony whereof, I have signed this specification in the presence of two subscribing witnesses.

HENRY DESBOROUGH PHILLIPS.

Witnesses:
  E. R. TEMPLETON,
  AUGUSTUS BRUNER.